US012614044B1

(12) United States Patent
Sharma et al.

(10) Patent No.: US 12,614,044 B1
(45) Date of Patent: Apr. 28, 2026

(54) LARGE LANGUAGE MODEL NUMERICAL PROBLEM SOLUTION ARCHITECTURE

(71) Applicant: Intuit Inc., Mountain View, CA (US)

(72) Inventors: Sundip Sharma, Bengaluru (IN); Bibhakar Ranjan, Bangalore (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/271,705

(22) Filed: Jul. 16, 2025

(51) Int. Cl.
| | |
|---|---|
| *G06F 40/30* | (2020.01) |
| *G06F 40/111* | (2020.01) |
| *G06F 40/289* | (2020.01) |
| *G06F 40/51* | (2020.01) |
| *G06F 40/58* | (2020.01) |
| *G10L 15/16* | (2006.01) |
| *G10L 15/18* | (2013.01) |
| *G06F 40/284* | (2020.01) |
| *G06F 40/295* | (2020.01) |
| *G10L 15/22* | (2006.01) |

(52) U.S. Cl.
CPC ............ *G06F 40/58* (2020.01); *G06F 40/111* (2020.01); *G06F 40/289* (2020.01); *G06F 40/30* (2020.01); *G06F 40/51* (2020.01); *G10L 15/16* (2013.01); *G10L 15/1815* (2013.01);

*G10L 15/1822* (2013.01); *G06F 40/284* (2020.01); *G06F 40/295* (2020.01); *G10L 2015/221* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 12,079,570 | B1 * | 9/2024 | Mondlock | .............. G06F 40/20 |
| 2021/0326531 | A1 * | 10/2021 | Kumar | .................. G06F 40/279 |
| 2024/0354319 | A1 * | 10/2024 | Dinu | ................... G06F 16/3329 |
| 2024/0354320 | A1 * | 10/2024 | Procter | ................. G06F 40/103 |
| 2025/0265306 | A1 * | 8/2025 | Toshniwal | ............. G06F 17/11 |

* cited by examiner

*Primary Examiner* — Richard Z Zhu
(74) *Attorney, Agent, or Firm* — Lathrop GPM LLP

(57) ABSTRACT

A method includes obtaining a sequence of instructions for generating a final result of a computation from a large language model by processing a user prompt requesting the computation. The method further includes converting the sequence of instructions to a sequence of mathematical expressions. The method further includes evaluating, by a numerical solver, the sequence of mathematical expressions to obtain a corresponding set of intermediate results. The method further includes evaluating the final result using the corresponding set of intermediate results, and presenting the final result.

18 Claims, 6 Drawing Sheets

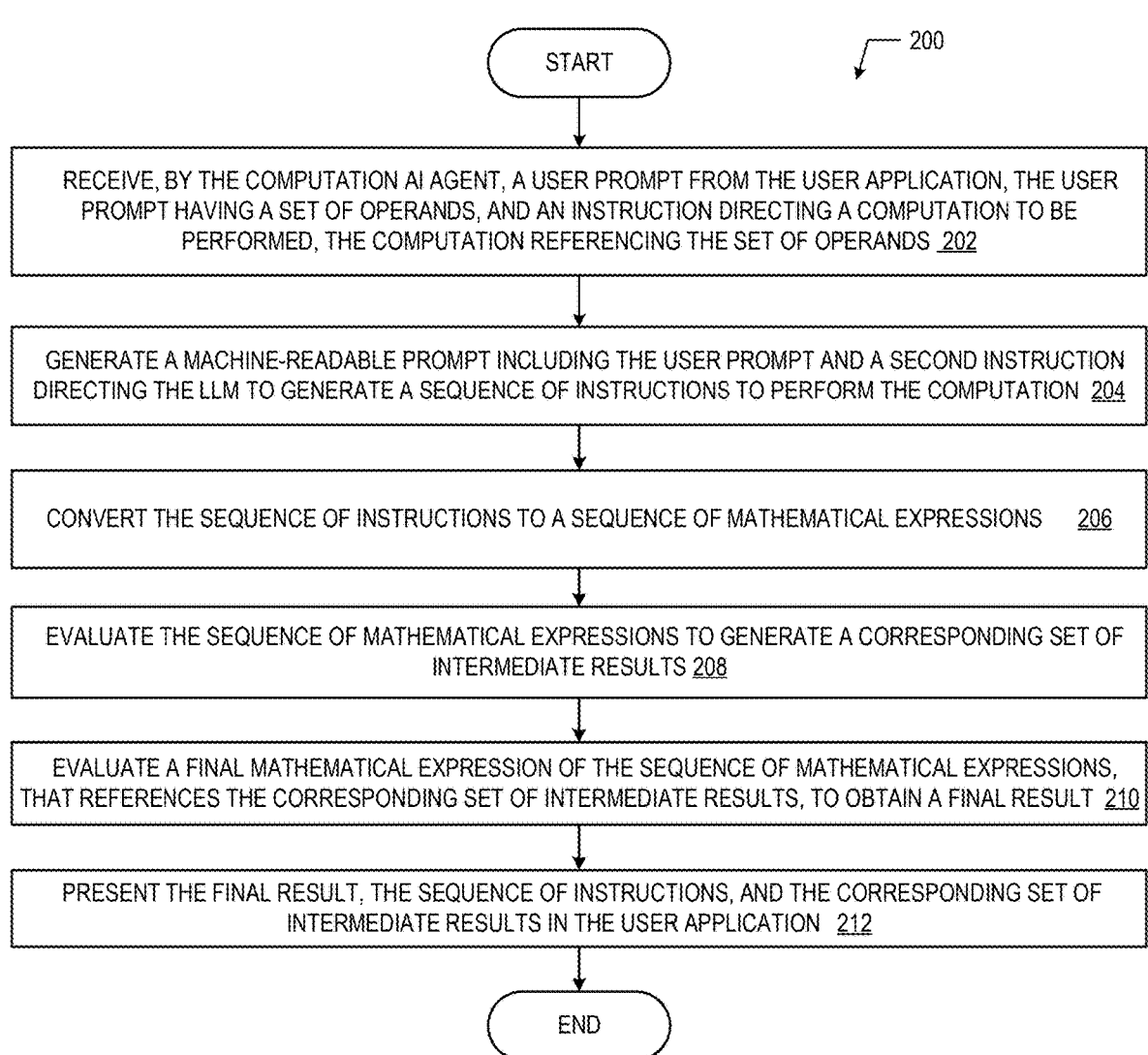

START

RECEIVE, BY THE COMPUTATION AI AGENT, A USER PROMPT FROM THE USER APPLICATION, THE USER PROMPT HAVING A SET OF OPERANDS, AND AN INSTRUCTION DIRECTING A COMPUTATION TO BE PERFORMED, THE COMPUTATION REFERENCING THE SET OF OPERANDS 202

GENERATE A MACHINE-READABLE PROMPT INCLUDING THE USER PROMPT AND A SECOND INSTRUCTION DIRECTING THE LLM TO GENERATE A SEQUENCE OF INSTRUCTIONS TO PERFORM THE COMPUTATION 204

CONVERT THE SEQUENCE OF INSTRUCTIONS TO A SEQUENCE OF MATHEMATICAL EXPRESSIONS 206

EVALUATE THE SEQUENCE OF MATHEMATICAL EXPRESSIONS TO GENERATE A CORRESPONDING SET OF INTERMEDIATE RESULTS 208

EVALUATE A FINAL MATHEMATICAL EXPRESSION OF THE SEQUENCE OF MATHEMATICAL EXPRESSIONS, THAT REFERENCES THE CORRESPONDING SET OF INTERMEDIATE RESULTS, TO OBTAIN A FINAL RESULT 210

PRESENT THE FINAL RESULT, THE SEQUENCE OF INSTRUCTIONS, AND THE CORRESPONDING SET OF INTERMEDIATE RESULTS IN THE USER APPLICATION 212

END

*FIG. 2*

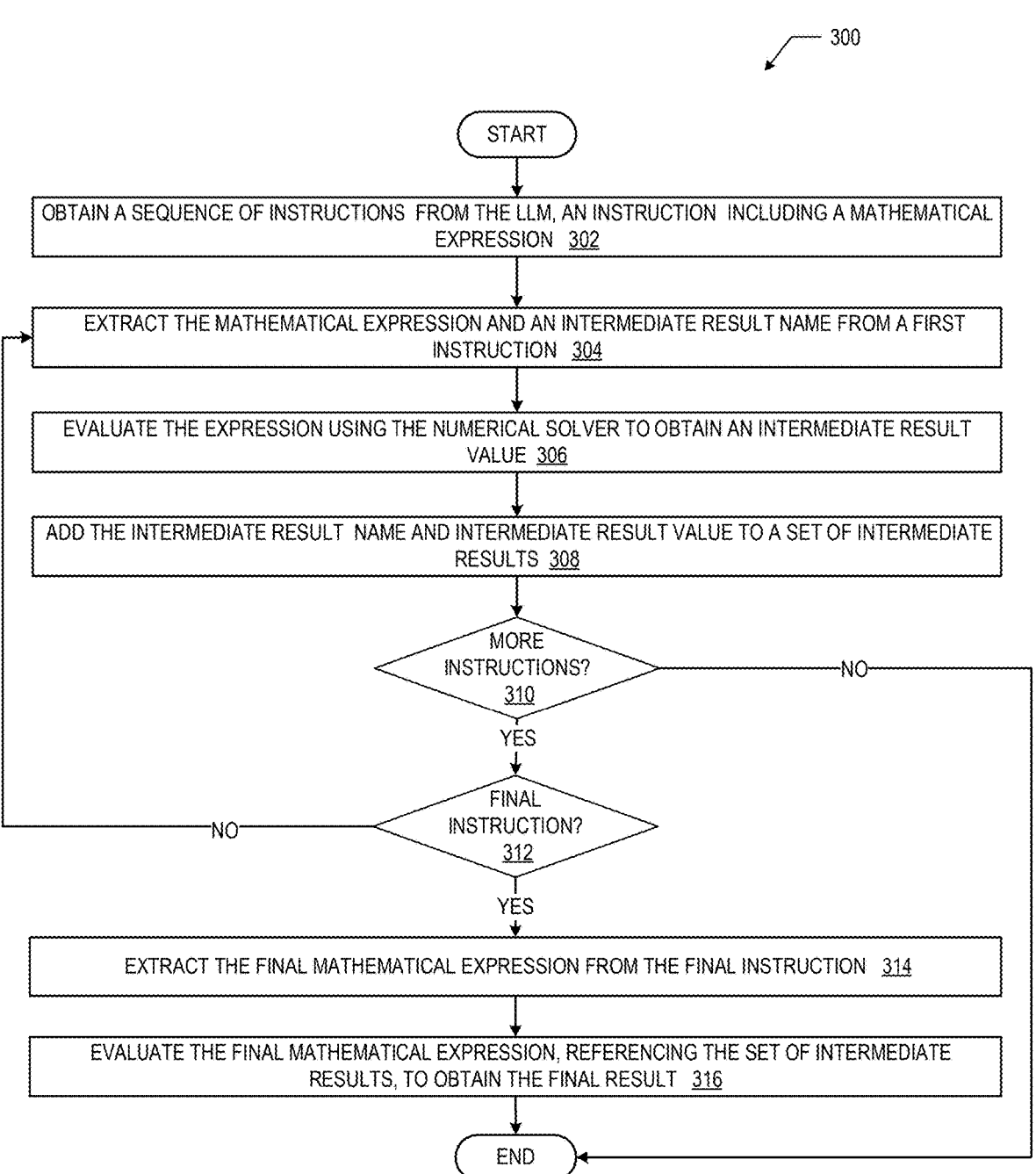

300

START

OBTAIN A SEQUENCE OF INSTRUCTIONS FROM THE LLM, AN INSTRUCTION INCLUDING A MATHEMATICAL EXPRESSION  302

EXTRACT THE MATHEMATICAL EXPRESSION AND AN INTERMEDIATE RESULT NAME FROM A FIRST INSTRUCTION  304

EVALUATE THE EXPRESSION USING THE NUMERICAL SOLVER TO OBTAIN AN INTERMEDIATE RESULT VALUE  306

ADD THE INTERMEDIATE RESULT NAME AND INTERMEDIATE RESULT VALUE TO A SET OF INTERMEDIATE RESULTS  308

MORE INSTRUCTIONS?  310

NO

YES

FINAL INSTRUCTION?  312

NO

YES

EXTRACT THE FINAL MATHEMATICAL EXPRESSION FROM THE FINAL INSTRUCTION  314

EVALUATE THE FINAL MATHEMATICAL EXPRESSION, REFERENCING THE SET OF INTERMEDIATE RESULTS, TO OBTAIN THE FINAL RESULT  316

END

FIG. 3

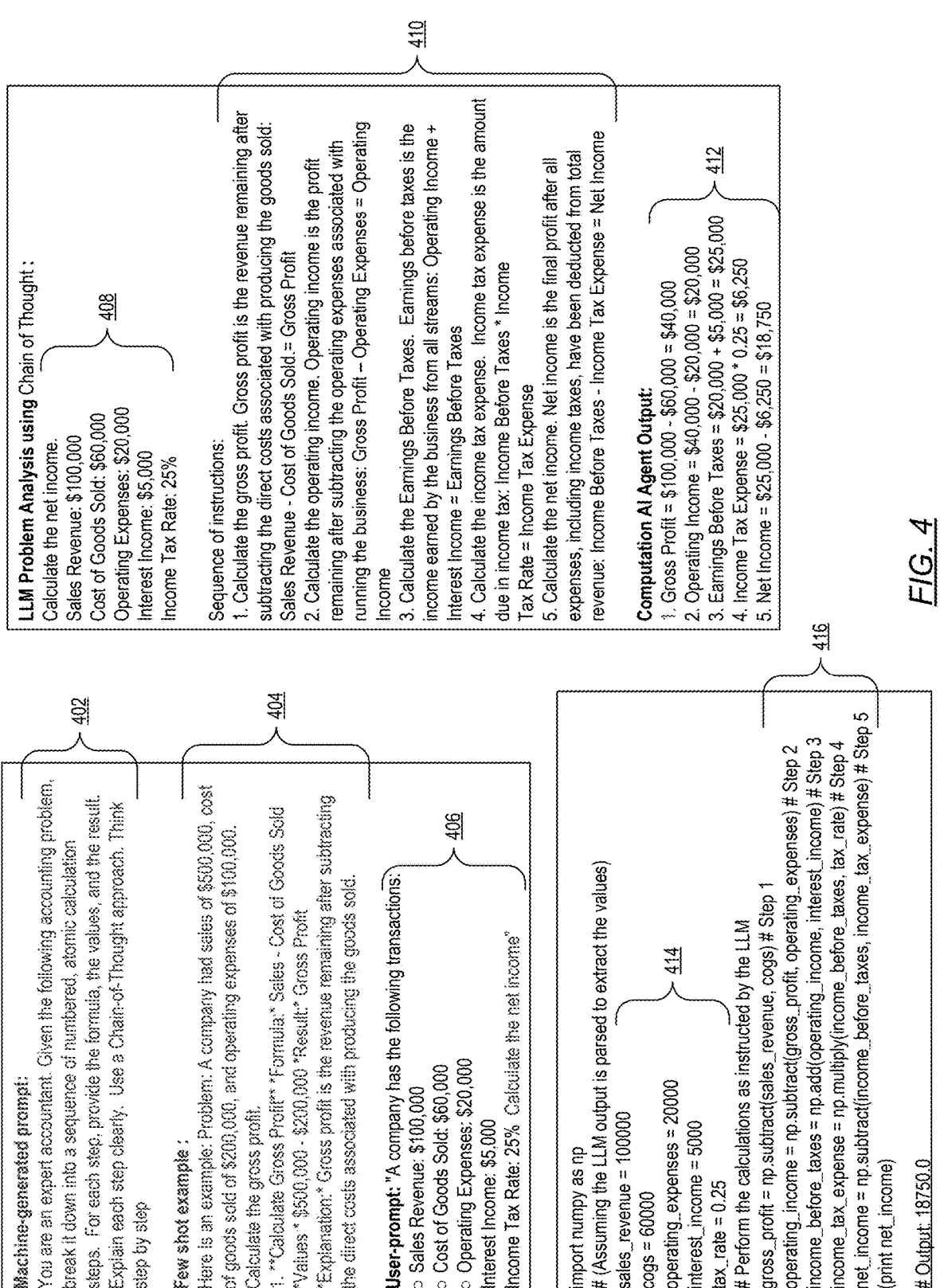

Machine-generated prompt:
You are an expert accountant. Given the following accounting problem, break it down into a sequence of numbered, atomic calculation steps. For each step, provide the formula, the values, and the result. Explain each step clearly. Use a Chain-of-Thought approach. Think step by step.

Few shot example :
Here is an example: Problem: A company had sales of $500,000, cost of goods sold of $200,000, and operating expenses of $100,000. Calculate the gross profit.
1. Calculate Gross Profit *Formula:* Sales - Cost of Goods Sold *Values:* $500,000 - $200,000 *Result:* Gross Profit
*Explanation:* Gross profit is the revenue remaining after subtracting the direct costs associated with producing the goods sold.

User-prompt: "A company has the following transactions:
o Sales Revenue: $100,000
o Cost of Goods Sold: $60,000
o Operating Expenses: $20,000
Interest Income: $5,000
Income Tax Rate: 25%  Calculate the net income"

402

404

406

LLM Problem Analysis using Chain of Thought :
Calculate the net income.
Sales Revenue: $100,000
Cost of Goods Sold: $60,000
Operating Expenses: $20,000
Interest Income: $5,000
Income Tax Rate: 25%

Sequence of instructions:
1. Calculate the gross profit. Gross profit is the revenue remaining after subtracting the direct costs associated with producing the goods sold: Sales Revenue - Cost of Goods Sold.= Gross Profit
2. Calculate the operating income. Operating income is the profit remaining after subtracting the operating expenses associated with running the business: Gross Profit – Operating Expenses = Operating Income
3. Calculate the Earnings Before Taxes. Earnings before taxes is the income earned by the business from all streams: Operating Income + Interest Income = Earnings Before Taxes
4. Calculate the income tax expense. Income tax expense is the amount due in income tax: Income Before Taxes * Income Tax Rate = Income Tax Expense
5. Calculate the net income. Net income is the final profit after all expenses, including income taxes, have been deducted from total revenue: Income Before Taxes - Income Tax Expense = Net Income

Computation AI Agent Output:
1. Gross Profit = $100,000 - $60,000 = $40,000
2. Operating Income = $40,000 - $20,000 = $20,000
3. Earnings Before Taxes = $20,000 + $5,000 = $25,000
4. Income Tax Expense = $25,000 * 0.25 = $6,250
5. Net Income = $25,000 - $6,250 = $18,750

408

410

412

```
import numpy as np
# (Assuming the LLM output is parsed to extract the values)
sales_revenue = 100000
cogs = 60000
operating_expenses = 20000
interest_income = 5000
tax_rate = 0.25
# Perform the calculations as instructed by the LLM
gross_profit = np.subtract(sales_revenue, cogs) # Step 1
operating_income = np.subtract(gross_profit, operating_expenses) # Step 2
income_before_taxes = np.add(operating_income, interest_income) # Step 3
income_tax_expense = np.multiply(income_before_taxes, tax_rate) # Step 4
net_income = np.subtract(income_before_taxes, income_tax_expense) # Step 5
(print net_income)

# Output: 18750.0
```

612
OUTPUT DEVICE(S)

604
NON-PERSISTENT
STORAGE

602
COMPUTER
PROCESSOR(S)

606
PERSISTENT
STORAGE

608
COMMUNICATION
INTERFACE

610
INPUT DEVICE(S)

620
NETWORK

622
NODE X

• • •

624
NODE Y

626
CLIENT DEVICE

LARGE LANGUAGE MODEL NUMERICAL PROBLEM SOLUTION ARCHITECTURE

BACKGROUND

Large Language Models (LLMs) are integrated into software applications across a wide range of domains, including customer service, finance, education, healthcare, legal analysis, manufacturing, process engineering, etc. LLMs have advanced capabilities in areas of natural language interpretation, human-like response generation, and structuring complex information. These capabilities enhance the explainability, interaction experience, and insight generation of pre-existing software applications of the aforementioned domains.

LLMs are fundamentally probabilistic language models. Hence, reliance on LLM processing in domains that demand rigorous mathematical precision and deterministic accuracy may pose a risk. The risk may arise on account of LLMs generating inconsistent or logically incoherent numerical outputs across different execution instances, even when given the same input. Specifically, because LLMs are probabilistic models, LLMs are not trained to perform deterministic calculations. More particularly, LLMs may not have computation capabilities at the level of precision required. LLMs may occasionally produce correct numerical results. However, the intrinsically non-deterministic characteristics, or traits, of LLMs may not guarantee that LLMs will generate numerical results with precision, consistency, and auditability in certain situations.

SUMMARY

In general, in one aspect, one or more embodiments relate to a method. The method includes obtaining a sequence of instructions for generating a final result of a computation from a large language model (LLM) by processing a user prompt requesting the computation. The method further includes converting the sequence of instructions to a sequence of mathematical expressions. The method further includes evaluating, by a numerical solver, the sequence of mathematical expressions to obtain a corresponding set of intermediate results. The method further includes evaluating the final result using the corresponding set of intermediate results, and presenting the final result.

In general, in one aspect, one or more embodiments relate to a system. The system includes at least one computer processor and a user application, executing on the at least one computer processor. The system further includes a computation artificial intelligence (AI) agent, executing on the at least one computer processor. The system further includes a large language model (an LLM), executing on the at least one computer processor. The computation AI agent is configured for obtaining a sequence of instructions for generating a final result of a computation from the LLM by processing a user prompt requesting the computation. The computation AI agent is further configured for converting the sequence of instructions to a sequence of mathematical expressions. The computation AI agent is further configured to evaluate the sequence of mathematical expressions to obtain a corresponding set of intermediate results, using a numerical solver. The computation AI agent is further configured to evaluate, using the numerical solver, the final result using the corresponding set of intermediate results. The system is further configured for presenting the final result.

In general, in one aspect, one or more embodiments relate to a method. The method includes receiving a user prompt from a user application. The user prompt includes a set of operands, and an instruction in natural language requesting a computation. An operand includes an operand name and an operand value, and the computation references the set of operands. The method further includes generating a machine-readable prompt from a prompt template that includes the user prompt, and a second instruction configured to direct an LLM to generate a sequence of instructions for generating a final result of the computation. Successive instructions of the sequence of instructions include corresponding mathematical expressions corresponding to successive steps of the computation. A mathematical expression includes a partial computation of the set of operands and produces an intermediate result. The method further includes processing, by the LLM, the machine-readable prompt, to generate the sequence of instructions. The method further includes converting the sequence of instructions to a corresponding sequence of mathematical expressions. The method further includes evaluating, by a numerical solver, a first mathematical expression of the corresponding sequence of mathematical expressions to obtain a first intermediate result value. The first mathematical expression references a first set of operands. The first set of operands is obtained from a first instruction of the sequence of instructions. The first instruction corresponding to the first mathematical expression. The method further includes adding a first intermediate result name obtained from the first instruction and the first intermediate result value to a set of intermediate results. The set of intermediate results corresponds to the sequence of mathematical expressions. The method further includes evaluating, by the numerical solver, a final mathematical expression of the corresponding sequence of mathematical expressions to obtain the final result. The final mathematical expression references the set of intermediate results. The method further includes presenting the final result.

Other aspects of one or more embodiments will be apparent from the following description and the appended claims.

BRIEF DESCRIPTION OF DRAWINGS

FIG. 2 shows a flowchart of a method, in accordance with one or more embodiments.

FIG. 3 shows a flowchart of a method, in accordance with one or more embodiments.

FIG. 4 shows an example of a machine-generated prompt for an LLM, in accordance with one or more embodiments.

Like elements in the various figures are denoted by like reference numerals for consistency.

DETAILED DESCRIPTION

Figure 1:
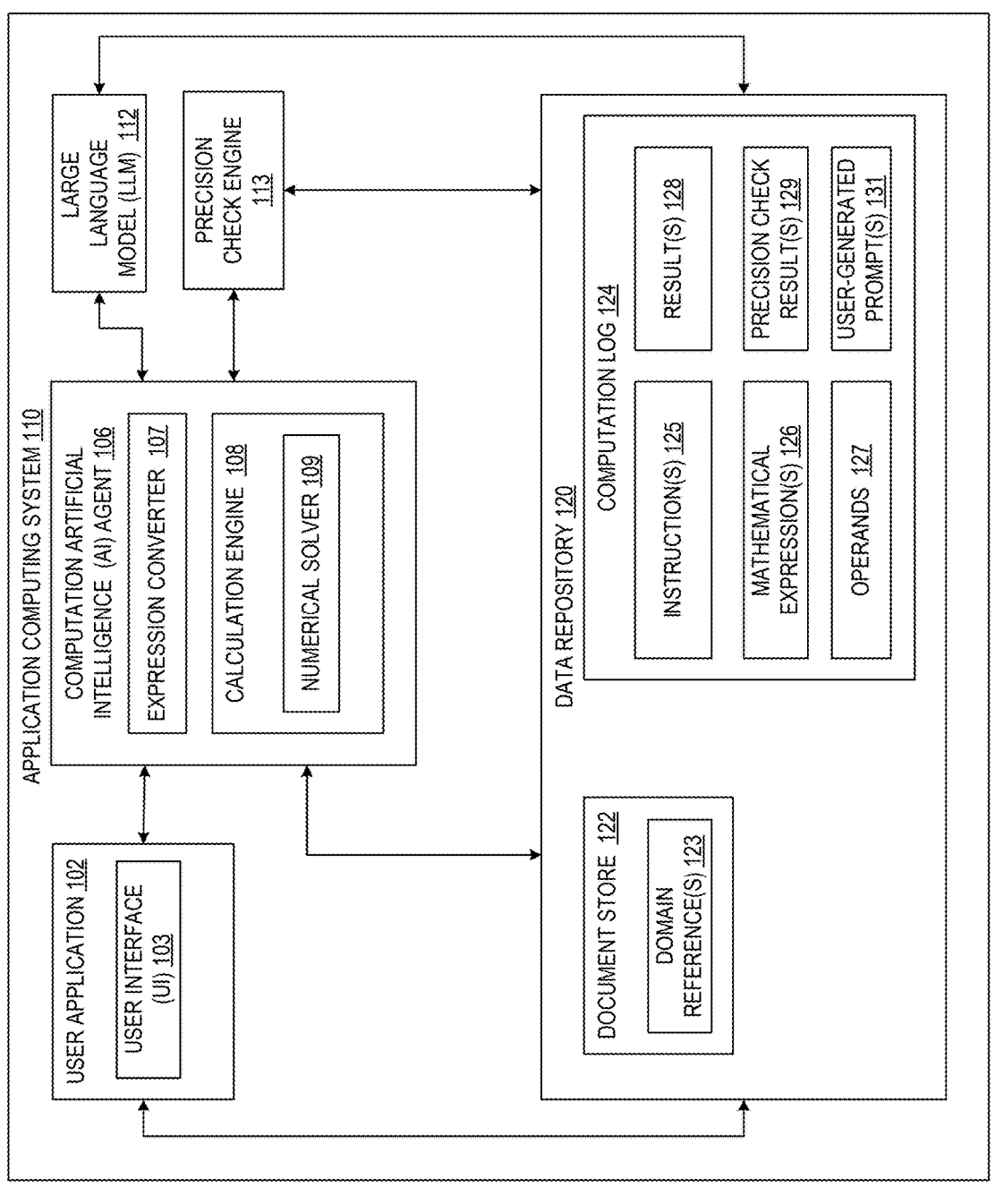
FIG. 1 shows an application computing system, in accordance with one or more embodiments.

One or more embodiments are directed to a system for large language model (LLM)-based numerical solutions for complex computation problems. Specifically, one or more embodiments combine LLMs with a numerical solver. The LLM provides natural language understanding and the capability to break down a complex computations into instructions that correspond to mathematical expressions. Conversely, numerical solvers provide for advanced capabilities in complex and precise computations of the mathematical expressions. However, numerical solvers may not have capabilities of breaking down a computation to affect improved explainability of generated results. Thus, one or more embodiments combine the LLM capabilities to break down a complex tasks into subtasks and the numerical solver to provide correct and precise numerical solutions to each subtask.

In one or more embodiments, the system employs an agentic framework for integrating LLMs with numerical solvers to analyze, explain, and perform precision-critical computations. An agentic framework is a structured architecture that integrates an LLM with additional tools and orchestration components. The LLM is facilitated to operate in a loop of planning, i.e., setting goals and breaking them into steps. The agentic framework further facilitates actions to implement the plan, i.e., executing tasks using external tools or APIs. The operational loop may further include observation, i.e., monitoring outcomes and gathering feedback, and reflection, i.e., adjusting plans based on results.

In the agentic framework, a computation artificial intelligence (AI) agent automates the reasoning and computation workflow between the LLM and numerical solvers. An AI agent is a software entity that autonomously orchestrates the interaction between an LLM and external computational tools. In one or more embodiments, the computation AI agent may guide the LLM in decomposing a complex computation into a sequence of instructions. The instructions correspond to mathematical expressions. The computation AI agent may invoke numerical solvers to evaluate the mathematical expressions corresponding to the sequence of instructions. The intermediate results obtained from evaluating the mathematical expressions may be synthesized by the computation AI agent into a final result.

Specifically, the computation AI agent may prompt the LLM to generate a sequence of instructions for generating a final result of a complex computation. The complex computation may be requested in a user-generated prompt. The computation AI agent may direct the LLM to use structured reasoning using a "chain of thought" structured reasoning approach. In the chain of thought approach, the LLM is prompted to break down the complex computation into a sequence of instructions. The sequence of instructions constitutes the calculation of successive steps, or successive partial computations, of the computation. The sequence of instructions may include natural language directives and explanations of each step of the complex computation and mathematical expressions for each step, or partial computation. The computation AI agent may further convert the sequence of instructions to a corresponding sequence of mathematical expressions, in a format recognizable by a numerical solver. The AI agent may then invoke numerical solver(s) to perform precise calculations of the sequence of mathematical expressions to produce intermediate results. Finally, the AI agent may synthesize the intermediate results into a final result.

To further enhance reliability, the system may include a precision check engine that validates both the LLM's interpretation and the numerical results. The AI agent may be configured to invoke the precision check engine to ensure consistency between the semantic breakdown and the computed outputs and validate the intermediate results and final result. The precision check engine may further generate an auditable record of both reasoning and computation, rendering transparency and traceability of the results.

As shown above, embodiments employ the benefits of each of the components of the system without being penalized by the components' defects. For example, LLMs have advanced capabilities in understanding and producing natural language, but are not trained in precision-requiring tasks, such as executing rules or performing calculations. To that end, embodiments achieve accuracy by the LLM performing the LLM's core competency (i.e., breaking down a natural language query to instructions) while the remaining components handle the precision-requiring tasks (i.e., the AI agent includes business logic and rules to convert the instructions to mathematical expressions, and a numerical solver is included in the system to solve the mathematical expressions). Because the LLM operates on probabilities, the LLM may not perform the numerical tasks requiring precision. Instead, the AI agent performs the conversion of the mathematical expression to a form that is recognizable by the numerical solver, after the LLM is used to understand the complex computation and generate natural language instructions as the steps of solving the complex computation. Likewise, the numerical solver has greater precision for solving math problems than the LLM or the AI agent. Accordingly, embodiments realize the benefits of each of the components.

Attention is now turned to the figures. FIG. 1 shows an application computing system (110), in accordance with one or more embodiments. The application computing system (110) is one or more computer processors, data repositories, communication devices, and supporting hardware and software. The application computing system (110) may be in a distributed computing environment. The application computing system (110) includes a computer processor. The computer processor is one or more hardware or virtual processors which may execute computer readable program code that defines one or more applications, such as the user application (102), the computation artificial intelligence (AI) agent (106), the LLM (112), and the precision check engine (113). An example of the computer processor is described with respect to the computer processor(s) (602) of FIG. 6A. Thus, the application computing system (110) is configured to execute one or more applications, such as the user application (102), the computation AI agent (106), the LLM (112), or the precision check engine (113). An example of a computer system and network that may form the application computing system (110) is described with respect to FIG. 6A and FIG. 6B.

The system shown in FIG. 1 includes a data repository (120). The data repository (120) is a type of storage unit or device for storing machine-readable data. Diverse components of the application computing system (110) may store data in the data repository (120) or obtain data from the data repository (120). The data repository (120) may organize and manage data using various data abstraction models or logical data representations. Examples of logical data representations include file systems, relational or non-relational databases, serialized data structures, or other schema-based or schema-less storage paradigms. The data repository (120) may include multiple different, potentially heterogeneous, storage units and/or physical storage devices.

The data repository (120) includes a document store (122). The document store (122) includes domain reference(s) (123). A domain is an area of expertise or a subject matter. The domain references (123) constitute a corpus of domain-specific documentation, logic, and rules. The domain references (123) may inform the validity, precision requirements, and boundary conditions of results generated by the computation AI agent (106), in conjunction with the LLM (112).

For example, a domain reference (123) may pertain to accounting principles, rules, and standards. The domain reference (123) may include accounting methodologies, such as double-entry bookkeeping, i.e., a principle requiring that every financial transaction affects at least two accounts to maintain the accounting equation. Another accounting methodology may be variance analysis, a technique used to evaluate the difference between planned and actual financial performance, governed by pre-defined thresholds or rules. The methodologies may be expressed as rules, principles, or procedural logic.

The domain reference (123) may further include rules for ensuring that debits equal credits, checks for results falling within reasonable ranges, and other compliance mechanisms aligned with accounting standards. In one or more embodiments, the domain reference (123) may be in a machine-readable document format, such as JavaScript Object Notation (JSON), Extensible Markup Language (XML), YAML, or Protocol Buffers. In other embodiments, the domain reference (123) may be a natural language document, such as a PDF, Markdown file, or plain text. In one or more embodiments, the document store (122) storing the one or more domain references (123) may be a document-oriented database, e.g., MONGODB®, COUCHBASE®, or AMAZON® DocumentDB. The precision check engine (113) may use the domain references (123) to perform operations validating and verifying the results and explanations of the computations performed by the computation AI agent.

The data repository (120) further includes a computation log (124). The computation log (124) is an audit trail log of the computations performed by the computation AI agent (106) when servicing a request from the user application (102). The request may be for a complex computation to be performed. An entry in the computation log (124) may include request-related data and results from processing steps of the complex computation. Accordingly, as shown in FIG. 1, an entry in the computation log (124) may include one or more of instructions (125), mathematical expressions (126), operands (127), results (128), precision check results (129), and user-generated prompts (131).

The request from the user application may be in the form of the user-generated prompt (131). The user-generated prompt (131) may include one or more operands (127), and an instruction to perform a complex computation. The instruction of the user-generated prompt (131) may be processed by the computation AI agent (106) in conjunction with the LLM (112). The LLM (112) may break down the complex computation into a sequence of instructions. The sequence of instructions may constitute successive steps of the complex computation.

The sequence of instructions may include mathematical expressions, that are directed to partial computations of the complex computation. A mathematical expression is a finite combination of symbols, operators, constants, variables, and functions that represent a computable quantity or relationship. A mathematical expression encodes a computation or logical structure that can be evaluated or transformed (e.g., simplified or otherwise changed) according to the rules of mathematics. Evaluating the mathematical expression has a deterministic result. Mathematical expressions may include variables, constants, numbers, arithmetic and logical operators, functions and structural grouping notations (e.g., parentheses). For example, an instruction may be "Calculate the area, A, of the circle. The area of a circle is the product of pi and the square of the radius: $\pi r^2 = A$." The instruction includes a directive to calculate the area, an explanation of what and how the area is calculated, and the mathematical expression in symbolic notation.

The sequence of instructions may be stored in the computation log (124) as instruction(s) (125). Further, the computation AI agent (106) may extract and log mathematical expressions in the sequence of instructions as mathematical expression(s) (126) of the computation log (124).

The computation AI agent (106) may invoke the numerical solver (109) to evaluate the mathematical expressions (126). The results obtained from evaluating the mathematical expressions (126) may be logged as the result(s) (128) in the computation log (124). Further, the precision check engine (113) may perform various operations on the results (128). The results of the precision check may be logged as the precision check results (129). The computation log (124) may be stored in a machine and/or human readable format, for example, a text file, JSON, XML, or YAML documents, etc.

The application computing system (110) further includes a computation AI agent (106). The computation AI agent (106) is software, or application specific hardware which, when executed by the computer processor, coordinates and controls operation of the LLM (112), the precision check engine (113), and the calculation engine (108). As shown in FIG. 1, the computation AI agent (106) includes the calculation engine (108). However, in other embodiments, the calculation engine (108) may be a separate software entity of the application computing system (110). In one or more embodiments, the computation AI agent (106) may be configured to perform the methods of FIG. 2 and FIG. 3.

The computation AI agent (106) further includes an expression converter (107). The expression converter (107) is a tool for extracting mathematical expressions from the sequence of (natural language) instructions generated by the LLM (112). In one or more embodiments, the expression converter (107) may be a tool or library, such as SymPy, LaTexML, MathML, etc. In other embodiments, the expression converter (107) may be software or application-specific hardware configured for extracting the mathematical expressions from the sequence of instructions. For example, the expression converter (107) may use regular expression libraries and pattern matching techniques to parse the natural language instructions and obtain the mathematical expressions. Additionally, or alternatively, the expression converter (107) may use the LLM (112) to extract the (symbolic) mathematical expression. Other methods may be used.

The computation AI agent (106) further includes a calculation engine (108). The calculation engine (107) includes a numerical solver (109). The numerical solver (109) is a computational tool for finding solutions to mathematical problems. The numerical solver (109) may evaluate exact mathematical expressions, as well as obtaining results for computations that cannot be solved analytically (i.e., with exact formulas). Numerical solvers may use numerical analysis algorithms, such as Newton-Raphson for finding roots, Runge-Kutta methods for ordinary differential equations, gradient descent optimization, etc. Further, the numerical solver (109) may evaluate exact formulas at the maximum capacity for precision and accuracy that may be afforded by the processor(s) of the application computing system (110).

In one or more embodiments, the calculation engine (108) is software or application-specific hardware configured to obtain a mathematical expression and operands from the expression converter (107). Further, the calculation engine (107) may be configured to programmatically invoke the numerical solver with parameters. The parameters may include the mathematical expression and operands. The calculation engine (108) may be further configured to manage the intermediate results obtained from evaluating the mathematical expressions. For example, the calculation engine (108) may pass one or more intermediate results obtained from evaluations of previous mathematical expressions as operands of a current mathematical expression being evaluated by the numerical solver (109).

The application computing system (110) further includes an LLM (112). The LLM (112) is an advanced artificial intelligence system trained on a corpus comprising natural language and mathematical data. In one or more embodiments, the LLM (112) may be particularly configured to interpret natural language input and generate structured outputs that encode computational logic. The LLM (112) decomposes a complex computational problem into a sequence of instructions, each instruction corresponding to a partial computation. Further, an instruction generated by the LLM (112) may include a directive specifying the operation to be performed and an explanation providing a natural language rationale for the operation. Furthermore, the instruction may include a mathematical expression representing the operation in symbolic notation suitable for evaluation by a numerical or symbolic solver. Thus, the LLM (112) functions as a semantic intermediary between human-readable problem descriptions and machine-executable computational workflows. The LLM (112) transforms high-level problem statements into structured, stepwise logic. Additionally, the LLM (112) may identify dependencies among partial computations and maintain semantic coherence across sequential instructions. Examples of LLMs include CHATGPT®, CLAUDE BY ANTHROPIC®, LLAMA®, etc. In one or more embodiments, the LLM may be a foundation AI model with a transformer architecture, fine-tuned on the document corpus of the document store (122).

The application computing system (110) further includes a precision check engine (113). The precision check engine (113) is software or application-specific hardware, which when executed by the processor, validates the LLM's interpretation and the numerical results, ensuring consistency and generating a complete audit trail. In one or more embodiments, the precision check engine (113) may perform a semantic similarity analysis to compare the explanations generated by the LLM for individual calculations with one or more domain-specific reference explanations. The reference explanations may be pre-defined or dynamically generated. Further, the precision check engine may utilize embedding-based similarity techniques, such as Sentence-BERT (Bidirectional Encoder Representations from Transformers), to assess semantic alignment. Furthermore, the precision check engine may perform numerical reconciliation by comparing the final numerical results and intermediate computational outputs with expected values. The expected values may be derived from domain-specific rules. For example, if the computation is an accounting computation, the numerical reconciliation may be based on accounting principles, such as double-entry bookkeeping and variance analysis.

Additionally, the precision check engine may apply a set of pre-defined rules and constraints to the calculated values to perform logical consistency checks. Continuing with the previous accounting example, the logical consistency check may include verifying that debits equal credits and validating financial ratios. The logical consistency check may further entail ensuring that computed values fall within reasonable ranges and confirming compliance with applicable accounting standards. Further, the precision check engine may generate an audit trail that logs the computational process. The audit trail may be stored in the data repository (120) as the computation log (124).

The application computing system (110) further includes a user application (102). In one or more embodiments, the user application (102) may be a web-based client application, operating within a web browser. Other embodiments of the user application (102) may include native desktop applications, mobile applications, remote desktop clients, etc. The user application (102) includes a user interface (UI) (103). The user prompt may be provided via the UI (103) by a user inputting the user prompt for the complex computation. The UI (103) may further be configured to present the final result and intermediate results of the computation. The presented output may further include the sequence of instructions including directives and explanations generated by the LLM (112).

While FIG. 1 shows a configuration of components, other configurations may be used without departing from the scope of one or more embodiments. For example, various components may be combined to create a single component. As another example, the functionality performed by a single component may be performed by two or more components.

FIG. 2 shows a flowchart 200 of a method for generating, by an LLM, a sequence of instructions including mathematical expressions to perform a computation and using a numerical solver to evaluate the mathematical expressions, in accordance with one or more embodiments. The method of FIG. 2 may be implemented using the system of FIG. 1 and one or more of the steps may be performed on or received at one or more computer processors. While the various steps in the flowchart 200 are presented and described sequentially, at least some of the steps may be executed in different orders, may be combined or omitted, and at least some of the steps may be executed in parallel. Furthermore, the steps may be performed actively or passively.

In Block 202, a user prompt is received by the computation AI agent. The user prompt is received as a request from the user application. The user prompt includes a set of operands, and an instruction. The instruction is a directive for a complex computation to be performed, to generate a final result. The user prompt may be received in a natural language including the computation. The computation references the set of operands. In one or more embodiments, the set of operands may include an operand name and an operand value for each of one or more of the operands. The computation "referencing" the set of operands indicates that the computation is to be performed using the set of operands. Because of the complexity, performing the computation generally entails performing multiple partial computations of the set of operands, to produce intermediate results. Further, the intermediate results may be combined or transformed in a final partial computation to produce the final result. An example of the user prompt is shown in FIG. 4.

In Block 204, a machine-readable prompt is generated. The machine-readable prompt includes the user prompt. The machine-readable prompt further includes a second instruction directing the LLM to generate a sequence of instructions to perform the computation. In one or more embodiments, the computation AI agent may "wrap" the user prompt with a machine-readable prompt, for which the user prompt is an input. The computation AI agent may generate a machine-readable prompt from a prompt template. The second instruction may direct the LLM to generate the sequence of instructions. In one or more embodiments, the second instruction may direct the LLM to semantically "break down" the computation into a sequence of instructions. The successive instructions of the sequence of instructions may include mathematical expressions corresponding to successive steps. The successive steps may be a result of the semantic breaking down of the computation. A mathematical expression corresponding to a step may include a partial computation of the set of operands. The mathematical expression, when evaluated, may produce an intermediate result. Further, the LLM may process the machine-readable prompt to generate the sequence of instructions.

In one or more embodiments, the LLM may be prompted to use a "chain of thoughts" approach. "Chain of thoughts" refers to a structured reasoning process where the LLM is guided to break down a complex task into a sequence of intermediate steps. In the chain of thoughts process, the LLM's ability to solve problems that require multi-step reasoning is improved. For example, the ability of the LLM to solve problems such as mathematical computations, logical deductions, or procedural tasks may be improved. For example, the prompt to the LLM may include an instruction to "think step by step." Providing the prompt in this manner may cause the LLM to generate intermediate reasoning steps before arriving at a final answer. Other structured reasoning processes may include Tree of Thought, Reason+Act (Re-Act), self-consistency, Scratchpad, Program-aided Chain of Thoughts, Reflexion, etc.

An example of a framework that facilitates structured reasoning in programmatic LLM prompting is LANG-CHAIN®. LANGCHAIN® is a programming library and application programming interface (API) for building applications that integrate LLMs with external tools, memory, and structured workflows. In particular, LANGCHAIN® may provide abstractions for prompt templates. Prompt templates are reusable prompt structures that may include variables like user input or context. Further, LANG-CHAIN® may provide an abstraction for a "chain." Chains are sequences of calls to LLMs or other tools, where the output of one step can be passed as input to the next. In an example implementation, LANGCHAIN® may be used to instantiate a chain. Further, a prompt template may be instantiated. The instantiated prompt template may wrap the user prompt. The LLM is further programmatically invoked with the instantiated prompt template. The LLM may generate a sequence of instructions and return the sequence of instructions in the instantiated chain. The sequence of instructions is the "chain of thoughts." Other frameworks and APIs may be used.

In this manner, a sequence of instructions for generating a final result of a computation may be obtained from the LLM by processing the user prompt requesting the computation.

In Block 206, the sequence of instructions is converted to a sequence of mathematical expressions. Each instruction in the sequence is individually converted into a corresponding mathematical expression. In one or more embodiments, when the machine-readable prompt generated in Block 204 is generated, the machine-readable prompt may further include a mathematical expression template. The mathematical expression template guides the LLM to generate mathematical expressions for each partial computation step in a standardized format. For example, the standardized format may have the mathematical expression operators and operands situated on the left hand side (LHS) of the "=" sign, and the result situated on the right hand side (RHS) of the "=" sign. The standardized format of the mathematical expression may facilitate accurate extraction of the mathematical expression into a form that is readable by the numerical solver of the computation AI agent. Further, the standardized format may include a format for listing operands and their values, for example, "operand_name: <operand-value>," or, "A: 500." Thus, when the LLM generates the sequence of instructions, the successive instructions of the sequence of instructions include corresponding mathematical expressions in a format defined by the mathematical template. In one or more embodiments, the expression convertor of the computation AI agent may convert the sequence of instructions to the sequence of mathematical expressions.

Further, in one or more embodiments, the computation AI agent may extract a first mathematical expression of a first instruction of the sequence of instructions. The first mathematical expression may be added to the sequence of mathematical expressions. The remaining instructions of the sequence of instructions may be processed in a similar manner, to obtain the sequence of mathematical expressions.

Thus, at the end of Block 206, the computation requested by the user on the operands provided by the user may be semantically resolved into a sequence of mathematical expressions in a standardized format. In one or more embodiments, the steps of Block 206, entailing the extraction of the mathematical expressions from the sequence of instructions of Block 204, may correspond to the method shown in FIG. 3, in particular, Block 304 of the flowchart 300.

In Block 208, the sequence of mathematical expressions obtained from Block 206 may be evaluated by a numerical solver to obtain a corresponding set of intermediate results. The numerical solver deterministically evaluates the mathematical expressions using the operands to generate an intermediate result. A mathematical expression of the sequence of mathematical expression, when evaluated, may perform a partial computation of the computation requested by the user, and may produce an intermediate result. Accordingly, a given mathematical expression may operate on a subset of the operands provided by the user. Further, certain mathematical expressions may operate on a subset of operands and a subset of intermediate results produced by preceding mathematical expressions of the sequence of mathematical expressions.

Accordingly, in one or more embodiments, evaluating the sequence of mathematical expressions may entail evaluating, by the numerical solver, a first mathematical expression of the sequence of mathematical expressions. The first mathematical expression may reference a first set of operands, to obtain a first intermediate result value. "Referencing" the first set of operands indicates that the first mathematical expression is defined using the operand names and depends on their values to be evaluated. Thus, the first mathematical expression may be expressed in terms of operand names of the first set of operands, such that the corresponding operand values are used in evaluating the first mathematical expression.

In one or more embodiments, the first set of operands may be obtained from a first instruction of the sequence of instructions. The first instruction may include the first mathematical expression. Further, in the first instruction, the intermediate result to which the first mathematical expression is directed may correspond to an intermediate result name. Accordingly, the first intermediate result name corresponding to the first mathematical expression may be extracted from the first instruction. The first intermediate result name and corresponding first intermediate result value may constitute a first intermediate result. Thus, the first intermediate result name and the first intermediate result value may be added (as the first intermediate result) to the corresponding set of intermediate results. The first intermediate result of the corresponding set of intermediate results may include the first intermediate result name and the first intermediate result value.

In the sequence of instructions, some instructions may include mathematical expressions that reference a subset of operands, and additionally, intermediate results. The intermediate results may correspond to previously evaluated mathematical expressions of preceding instructions. Accordingly, in one or more embodiments, a first mathematical expression of the sequence of mathematical expressions may be evaluated by the numerical solver to obtain a new intermediate result value. The first mathematical expression may reference a first set of operands and the corresponding set of intermediate results. An intermediate result of the corresponding set of intermediate results may include an intermediate result name and an intermediate result value. More particularly, the first mathematical expression may be defined using operand names of the first set of operands and intermediate result names of the corresponding set of intermediate results. The mathematical expression may depend on the respective operand and intermediate result values to be evaluated. Further, a new intermediate result name corresponding to the first mathematical expression may be extracted from a corresponding first instruction of the sequence of instructions. The new intermediate result name and the new intermediate result value may be added to the corresponding set of intermediate results.

Thus, in one or more embodiments, the sequence of instructions generated by the LLM may use intermediate results of preceding partial computations (i.e., preceding instructions) in succeeding instructions of the sequence.

As shown in the flowchart 200, in Block 206, the mathematical expressions are extracted, and in Block 208, the mathematical expressions are evaluated, in accordance with one or more embodiments. In other embodiments, a sequence as shown in flowchart 300 of FIG. 3 may be performed. More specifically, a mathematical expression may be extracted from an instruction and further, evaluated to obtain an intermediate result, before moving on to the next instruction.

In Block 210, a final mathematical expression of the sequence of mathematical expressions is evaluated. The final mathematical expression may reference the corresponding set of intermediate results. The final result may be obtained in this manner. In one or more embodiments, a final mathematical expression of a final instruction of the sequence of instructions may be extracted. The final mathematical expression may reference the corresponding set of intermediate results. More particularly, the final mathematical expression may be defined using intermediate result names. The final mathematical expression may depend on the corresponding intermediate result values to be evaluated. Further, the final mathematical expression may be evaluated by the numerical solver to obtain the final result.

In Block 212, the final result, the sequence of instructions, and the corresponding set of intermediate results are presented in the user application. In one or more embodiments, instructions of the sequence of instructions may include an explanation of the corresponding mathematical expressions. An example of the sequence of instructions is shown in FIG. 4.

In one or more embodiments, prior to presentation of the results in the user application, the set of intermediate results and the final result may go through an audit by the precision check engine. Further, the precision check engine may validate the corresponding set of intermediate results and the final result. Additionally, the precision check engine may store the sequence of instructions, the sequence of mathematical expressions, and the corresponding set of intermediate results to a computation log in the data repository. The computation log may serve as an audit trail log.

In one or more embodiments, the sequence of instructions may be processed by the precision check engine. The instructions of the sequence of instructions may include explanations of the partial computations affected by the mathematical expressions of the instructions. Accordingly, the precision check engine may compare the explanations included in the sequence of instructions with pre-defined or dynamically generated reference explanations.

In one or more embodiments, pre-defined reference explanations may be obtained from the document store in the data repository, including the domain references. Techniques such as Sentence-BERT or similar methods may be used to compare the LLM-generated explanations with the pre-defined reference explanations.

Further, the precision engine may perform numerical reconciliation of the intermediate results and the final result. Numerical reconciliation refers to comparing the final numerical results and intermediate calculations with expected values or those derived from domain-specific numerical computation principles. Furthermore, the precision check engine may perform logical consistency checks on the computed intermediate results and the final result. Logical consistency checks refer to validating the computed values (of the intermediate results and final result) against certain pre-defined rules and constraints. The pre-defined rules and constraints may be domain specific.

FIG. 3 shows a flowchart 300 of a method for parsing natural language instructions generated by the LLM to obtain mathematical expressions, operand names, and operand values, in accordance with one or more embodiments. The mathematical expressions, operand names, and operand values may be provided as input to a numerical solver for evaluation. The method of FIG. 3 may be implemented using the system of FIG. 1 and one or more of the steps may be performed on or received at one or more computer processors. While the various steps in the flowchart 300 are presented and described sequentially, at least some of the steps may be executed in different orders, may be combined or omitted, and at least some of the steps may be executed in parallel. Furthermore, the steps may be performed actively or passively.

In Block 302, a sequence of instructions is obtained from the LLM. An instruction of the sequence of instructions includes a mathematical expression. In one or more embodiments, the computation AI agent may retrieve the sequence of instructions from the LLM as a response to providing a machine-readable prompt to the LLM. The machine-readable prompt may correspond to the machine-readable prompt generated in Block 204 of the flowchart 200.

Blocks 304-312 form an iterative loop in which each instruction of the sequence of instructions is processed, and intermediate results are generated and added to the set of intermediate results. Further, Blocks 304-312 may represent an additional embodiment of the steps of Block 206 and Block 208 of the flowchart 200. Accordingly, in Block 304, a mathematical expression may be extracted from a first instruction (of the sequence of instructions).

In an example implementation, programmatically extracting the mathematical expression may entail identifying the mathematical expression in the natural language utterance that constitutes the first instruction. The mathematical expression may be in a standardized (i.e., pre-defined by the computation AI agent) format, for example, operand 1<operation 1>operand2<operation2>operand<operation3> operand4=intermediate_result_name; operand1: operand_value1, operand2: operand_value2, operand3: operand_value3, operand4: operand_value4.

Other formats may be possible.

Accordingly, techniques such as regular expressions (regex) or pattern matching may be used to identify the standardized format, such as text within quotes, within the natural language utterance. Regex application programming interfaces (APIs) are provided across a wide number of programming languages. Further, the extracted mathematical expression may be split into left-hand-side (LHS) and right-hand-side (RHS) parts. For example, regex or pattern matching may be used to split the mathematical expression at the equals sign ("=") to separate the LHS and RHS parts. Furthermore, operand names and corresponding operand values may be provided in the standardized format, for example, operand_name: operand_value. Again, techniques such as regex or pattern matching may be used to obtain the operand_name-operand_value pairs. The mathematical expression and operands may be added to a data structure. The data structure may be passed as an input parameter to a programmatic invocation of the numerical solver. The return value of the numerical solver may be added with the intermediate_result_name to the set of intermediate results.

In another example implementation, the computation AI agent may prompt the LLM to extract the mathematical expression, the operands, and the intermediate result name from the natural language utterance. Further, the prompt may direct the LLM to present the extracted expression, operands, and intermediate result name in a machine-readable structure. A machine-readable structure may be, for example, a data structure in a preferred programming language or a document format such as JavaScript Object Notation (JSON) or eXtended Markup Language (XML).

In Block 306, the expression is evaluated using the numerical solver to obtain an intermediate result value. In one or more embodiments, the computation AI agent may programmatically invoke the numerical solver with the mathematical expression extracted from the first instruction, and operand values. The numerical solver may return the intermediate result value.

In Block 308, the intermediate result name and intermediate result value are added to the set of intermediate results. In Block 310, a check is performed to determine if there are remaining instruction(s) to be processed in the sequence of instructions. If there are remaining instruction(s), control passes to Block 312, and a check is performed to determine if the (first instruction of the) remaining instruction(s) is a final instruction. If the remaining instruction is not a final instruction, the method continues for a succeeding iteration from Block 304. If the remaining instruction is a final instruction, control passes to Block 314.

Blocks 314 and 316 correspond to the step(s) of Block 210 of the method of FIG. 2. In Block 314, the final mathematical expression is extracted from the final instruction. In Block 316, the final mathematical expression is evaluated, to obtain the final result. The final mathematical expression may reference the set of intermediate results.

FIG. 4 shows an example of a machine-generated prompt for an LLM, in accordance with one or more embodiments. The machine-generated prompt wraps a user-provided prompt. FIG. 4 further shows an example of the output generated by the LLM and the computation AI agent. The following example is for explanatory purposes only and not intended to limit the scope of one or more embodiments.

In FIG. 4, section 402 shows a machine-generated prompt. The prompt may be generated by the computation AI agent. The "following accounting problem" refers to the user prompt which is additionally provided. The machine-generated prompt follows a prompt engineering known as role-task-format, or role-instruction context. Accordingly, the task and format are illustrated with a few-shot example, as shown in section 404. Section 406 shows the user-generated prompt. The user-generated prompt is thus "wrapped" with the machine-generated prompt and serves as the input to the machine-generated prompt. In section 408, the values of the operands and the operand names generated by the LLM when processing the machine-generated prompt are shown. Section 410 shows the sequence of instructions generated by the LLM. The instructions break down the computation requested in the user-generated prompt into individual calculation steps. The instruction begins with a computation of an intermediate result, for example "Calculate the gross profit." The computation direction is followed by an explanation of the intermediate result, for example, "Gross profit is the revenue remaining after subtracting the direct costs associated with producing the goods sold." The explanation is followed by the mathematical expression of the instruction. For example, the expression to calculate the gross profit is shown as "Sales Revenue−Cost of Goods sold=Gross Profit." In the example, the mathematical expression is shown on the LHS, and the intermediate result is shown on the RHS. Alternative formats may be possible.

Section 414 shows an example of computer program code in which variables are initialized with variable values. The variable names and variable values correspond to the extracted operands and operand values obtained by the computation AI agent in processing the LLM generated list of operands and operand values (section 408). Section 416 shows examples of programmatically invoking a numerical solver to compute the mathematical expressions of Section 410. Finally, Section 412 is an example of the intermediate results and the final result that may be computed by the computation AI agent after executing the computer program code of section 416.

Figure 5:
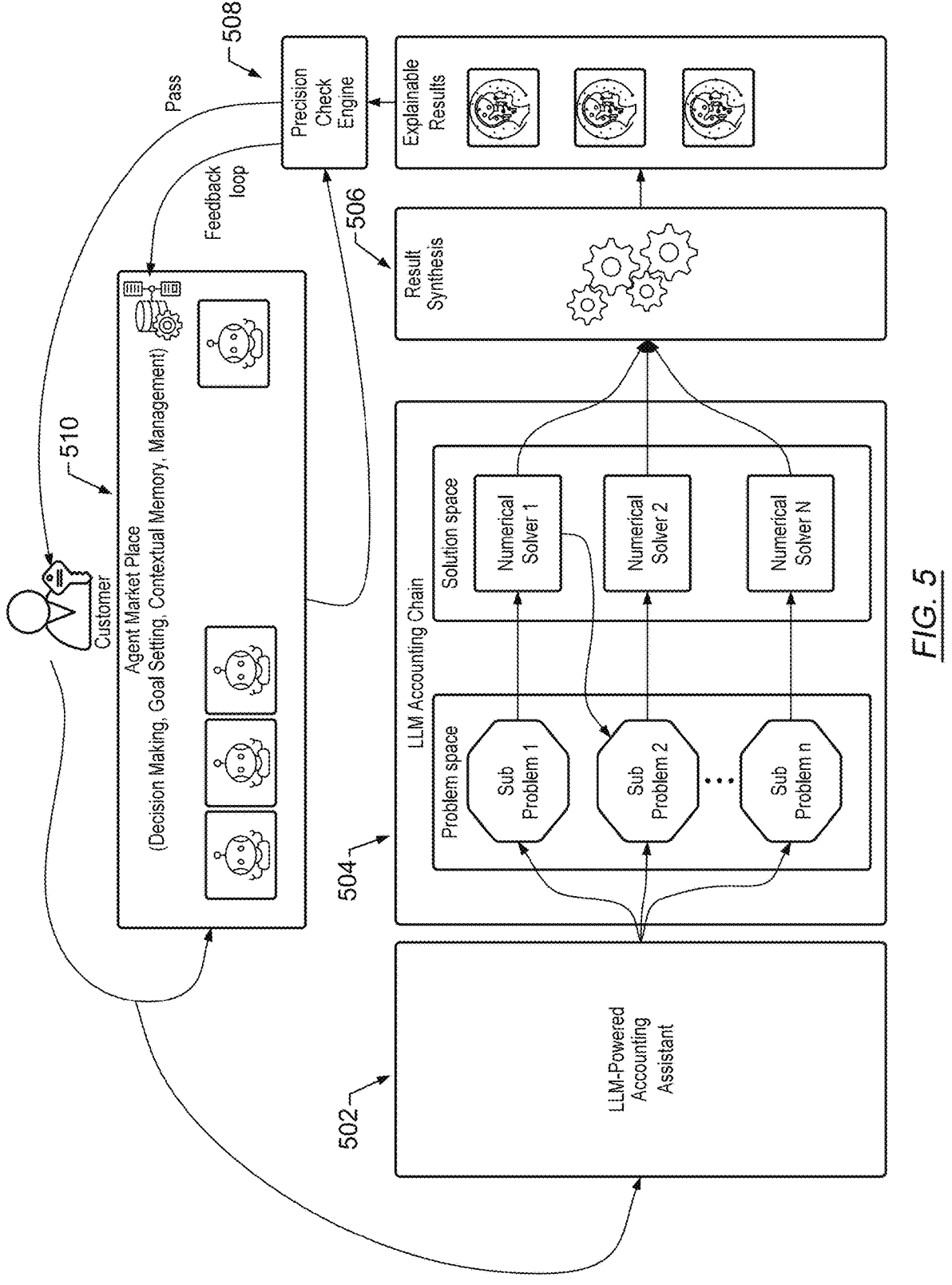
FIG. 5 shows an example of a functional view of an application computing system, in accordance with one or more embodiments.

FIG. 5 shows an example implementation of the system of FIG. 1, in accordance with one or more embodiments. The following example is for explanatory purposes only and not intended to limit the scope of one or more embodiments. In FIG. 5, Block 502 corresponds functionally to the computation AI agent (106) of FIG. 1. Blocks 504 and 506 represent diverse aspects of the functionality of the LLM accounting assistant of Block 502.

In Block 504, the problem space includes multiple sub-problems. The sub-problems of the problem space correspond to the instructions (125) of FIG. 1. The solution space of Block 504 shows multiple invocations of numerical solvers, corresponding to individual sub-problems in the problem space. The numerical solvers shown may correspond to the numerical solver (109) of FIG. 1. Thus, Block 504 may be considered to show a functional perspective of the computation AI agent (106) of FIG. 1.

Multiple pathways are shown between the problem space and the solution space of Block 504. The multiple pathways may be considered to represent the inputs to the sub-problems. In certain cases, intermediate results of a previously computed sub-problem may serve as input to a subsequent sub-problem. A detailed description of evaluating mathematical expressions including operands and intermediate results is provided in reference to the method of FIG. 2.

Block 506 shows an additional functional aspect of the LLM accounting assistant of Block 502. In an example implementation, the result synthesis functionality shown in Block 506 may be implemented in the calculation engine (108), which includes one or more instances of numerical solvers (109).

The output of the result synthesis block, namely, Block 508 is the explainable results shown in FIG. 5. The explainable results may include the intermediate and final results of the mathematical expressions, obtained from the numerical solvers, and corresponding explanations, generated by the LLM, in the sequence of instructions. The explainable results may further be processed by the precision check engine shown as Block 508. Block 508 corresponds to the precision check engine (113) of FIG. 1.

Block 510 shows an example front end implementation of a user application. The user application corresponds to the user application (102) of FIG. 1. The user application may be served by multiple AI agents, providing diverse functionality pertaining to the business logic of the application and computing resource management and operation of the user application system. One such agent may be the computation AI agent (106) of FIG. 1, shown as the LLM accounting assistant of Block 502.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figures 6A, 6B:
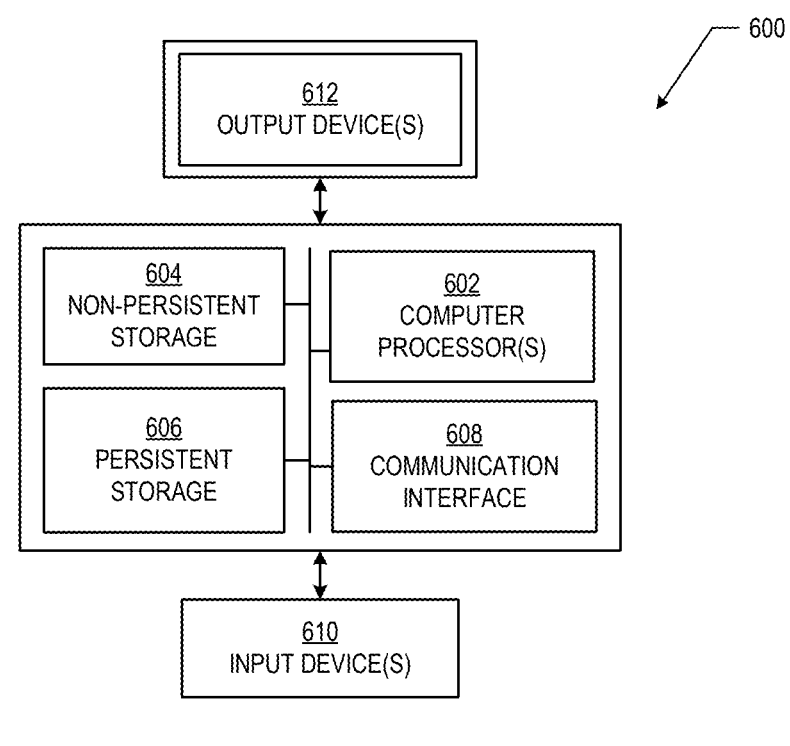
FIGS. 6A and 6B show an example of a computing system, in accordance with one or more embodiments.

For example, as shown in FIG. 6A, the computing system (600) may include one or more computer processor(s) (602), non-persistent storage device(s) (604), persistent storage device(s) (606), a communication interface (608) (e.g., Bluetooth interface, infrared interface, network interface, optical interface, etc.), and numerous other elements and functionalities that implement the features and elements of the disclosure. The computer processor(s) (602) may be an integrated circuit for processing instructions. The computer processor(s) (602) may be one or more cores, or micro-cores, of a processor. The computer processor(s) (602) includes one or more processors. The computer processor(s) (602) may include a central processing unit (CPU), a graphics processing unit (GPU), a tensor processing unit (TPU), combinations thereof, etc.

The input device(s) (610) may include a touchscreen, keyboard, mouse, microphone, touchpad, electronic pen, or any other type of input device. The input device(s) (610) may receive inputs from a user that are responsive to data and messages presented by the output device(s) (612). The inputs may include text input, audio input, video input, etc., which may be processed and transmitted by the computing system (600) in accordance with one or more embodiments. The communication interface (608) may include an integrated circuit for connecting the computing system (600) to a network (not shown) (e.g., a local area network (LAN), a wide area network (WAN) such as the Internet, mobile network, or any other type of network) or to another device, such as another computing device, and combinations thereof.

Further, the output device(s) (612) may include a display device, a printer, external storage, or any other output device. One or more of the output device(s) (612) may be the same or different from the input device(s) (610). The input device(s) (610) and output device(s) (612) may be locally or remotely connected to the computer processor(s) (602). Many different types of computing systems exist, and the aforementioned input device(s) (610) and output device(s) (612) may take other forms. The output device(s) (612) may display data and messages that are transmitted and received by the computing system (600). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (602), is configured to perform one or more embodiments, which may include transmitting, receiving, presenting, and displaying data and messages described in the other figures of the disclosure.

The computing system (600) in FIG. 6A may be connected to, or be a part of, a network. For example, as shown in FIG. 6B, the network (620) may include multiple nodes (e.g., node X (622) and node Y (624), as well as extant intervening nodes between node X (622) and node Y (624)). Each node may correspond to a computing system, such as the computing system shown in FIG. 6A, or a group of nodes combined may correspond to the computing system shown in FIG. 6A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (600) may be located at a remote location and connected to the other elements over a network.

The nodes (e.g., node X (622) and node Y (624)) in the network (620) may be configured to provide services for a client device (626). The services may include receiving requests and transmitting responses to the client device (626). For example, the nodes may be part of a cloud computing system. The client device (626) may be a computing system, such as the computing system shown in FIG. 6A. Further, the client device (626) may include or perform all or a portion of one or more embodiments.

The computing system of FIG. 6A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:

receiving a user prompt from a user application comprising a set of operands and an instruction in natural language requesting a computation referencing the set of operands;

transmitting, by a structured reasoning framework to a large language model (LLM), a machine-readable prompt from a prompt template, the machine-readable prompt comprising the user prompt and a second instruction directing the LLM to generate a sequence of instructions according to a structured reasoning process, wherein the LLM is a foundation artificial intelligence (AI) model having a transformer architecture, fine-tuned on a document corpus;

obtaining, from the LLM processing the machine-readable prompt, the sequence of instructions, each instruction comprising a directive specifying an operation to be performed and an explanation providing a natural language rationale for the operation, wherein the sequence of instructions describes generating a final result of the computation;

converting, by a computation artificial intelligence (AI) agent separate from the LLM, the sequence of instructions to a sequence of mathematical expressions;

evaluating, by a numerical solver, the sequence of mathematical expressions to obtain a corresponding set of intermediate results;

evaluating the final result using the corresponding set of intermediate results;

performing, by a precision check engine, operations comprising:

performing a semantic similarity analysis to compare respective explanations of the sequence of instructions with a plurality of domain-specific reference explanations, using an embedding-based similarity function, and comparing the set of intermediate results and the final result with expected values, wherein the LLM resides on a first node of a network, and the precision check engine resides on a second node of the network; and presenting the final result.

2. The method of claim 1, wherein successive instructions of the sequence of instructions comprise mathematical expressions corresponding to successive steps of the computation, a mathematical expression comprising a partial computation of the set of operands and producing an intermediate result.

3. The method of claim 2, further comprising:

processing, by the LLM, the machine-readable prompt to generate the sequence of instructions, wherein the machine-readable prompt further comprises a mathematical expression template, and the successive instructions of the sequence of instructions comprise corresponding mathematical expressions in a format defined by the mathematical expression template.

4. The method of claim 1, wherein converting the sequence of instructions further comprises:

extracting a first mathematical expression of a first instruction of the sequence of instructions; and adding the first mathematical expression to the sequence of mathematical expressions, to obtain the sequence of mathematical expressions.

5. The method of claim 1, wherein evaluating the sequence of mathematical expressions further comprises:

evaluating, by the numerical solver, a first mathematical expression of the sequence of mathematical expressions, wherein the first mathematical expression references a first set of operands, to obtain a first intermediate result value, wherein the first set of operands is obtained from a first instruction of the sequence of instructions, the first instruction corresponding to the first mathematical expression;

extracting a first intermediate result name corresponding to the first mathematical expression from the first instruction; and adding the first intermediate result name and the first intermediate result value to the corresponding set of intermediate results, wherein a first intermediate result of the corresponding set of intermediate results comprises the first intermediate result name and the first intermediate result value.

6. The method of claim 1, wherein evaluating the sequence of mathematical expressions further comprises:

evaluating, by the numerical solver, a first mathematical expression of the sequence of mathematical expressions, wherein the first mathematical expression references a first set of operands and the corresponding set of intermediate results, to obtain a new intermediate result value, wherein the first set of operands is obtained from a first instruction of the sequence of instructions corresponding to the first mathematical expression, and an intermediate result of the corresponding set of intermediate results comprises an intermediate result name and an intermediate result value;

extracting a new intermediate result name corresponding to the first mathematical expression from a corresponding first instruction of the sequence of instructions; and adding the new intermediate result name and the new intermediate result value to the corresponding set of intermediate results.

7. The method of claim 1, further comprising:

extracting a final mathematical expression of a final instruction of the sequence of instructions, wherein the final mathematical expression references the corresponding set of intermediate results; and evaluating, by the numerical solver, the final mathematical expression to obtain the final result.

8. The method of claim 1, further comprising:

validating, by the precision check engine, the corresponding set of intermediate results and the final result; and adding, by the precision check engine, the sequence of instructions, the sequence of mathematical expressions, and the corresponding set of intermediate results to a computation log.

9. The method of claim 1, wherein presenting the final result further comprises:

presenting the sequence of instructions, the corresponding set of intermediate results, and the final result, wherein an instruction of the sequence of instructions further comprises an explanation of a mathematical expression of the instruction.

10. A system, comprising:

at least one computer processor;

a user application, executing on the at least one computer processor;

a computation artificial intelligence (AI) agent, executing on the at least one computer processor; and a large language model (an LLM) that is separate from the computation AI agent, executing on the at least one computer processor, wherein the computation AI agent is configured for:

receiving a user prompt from the user application comprising a set of operands and an instruction in natural language requesting a computation referencing the set of operands, instantiating a machine-readable prompt from a prompt template, comprising the user prompt, and a second instruction directing the LLM to generate a sequence of instructions according to a structured reasoning process, wherein the LLM is a foundation artificial intelligence (AI) model having a transformer architecture, fine-tuned on a document corpus, causing the LLM to process the machine-readable prompt to obtain the sequence of instructions, each instruction comprising a directive specifying an operation to be performed and an explanation providing a natural language rationale for the operation, wherein the sequence of instructions describes generating a final result of the computation, converting the sequence of instructions to a sequence of mathematical expressions, evaluating, by a numerical solver of the computation AI agent, the sequence of mathematical expressions to obtain a corresponding set of intermediate results, evaluating, by the numerical solver, the final result using the corresponding set of intermediate results, causing a precision check engine to perform operations comprising:

performing a semantic similarity analysis to compare respective explanations of the sequence of instructions with a plurality of domain-specific reference explanations, using an embedding-based similarity function, and comparing the set of intermediate results and the final result with expected values, wherein the LLM resides on a first node of a cloud network, and the precision check engine resides on a second node of the cloud network, and presenting the final result.

11. The system of claim 10, wherein successive instructions of the sequence of instructions comprise mathematical expressions corresponding to successive steps of the computation, a mathematical expression comprising a partial computation of the set of operands and producing an intermediate result.

12. The system of claim 11, further configured for:

processing, by the LLM, the machine-readable prompt to generate the sequence of instructions, wherein the machine-readable prompt further comprises a mathematical expression template, and the successive instructions of the sequence of instructions comprise corresponding mathematical expressions in a format defined by the mathematical expression template.

13. The system of claim 10, further configured for converting the sequence of instructions, comprising:

extracting, by the computation AI agent, a first mathematical expression of a first instruction of the sequence of instructions; and adding, by the computation AI agent, the first mathematical expression to the sequence of mathematical expressions, to obtain the sequence of mathematical expressions.

14. The system of claim 10, further configured for evaluating the sequence of mathematical expressions, comprising:

evaluating, by the numerical solver, a first mathematical expression of the sequence of mathematical expressions, wherein the first mathematical expression references a first set of operands, to obtain a first intermediate result value, wherein the first set of operands is obtained from a first instruction of the sequence of instructions, the first instruction corresponding to the first mathematical expression;

extracting a first intermediate result name corresponding to the first mathematical expression from the first instruction; and adding the first intermediate result name and the first intermediate result value to the corresponding set of intermediate results, wherein a first intermediate result of the corresponding set of intermediate results comprises the first intermediate result name and the first intermediate result value.

15. The system of claim 10, further configured for evaluating the sequence of mathematical expressions, further comprising:

evaluating, by the numerical solver, a first mathematical expression of the sequence of mathematical expressions, wherein the first mathematical expression references a first set of operands and the corresponding set of intermediate results, to obtain a new intermediate result value, wherein the first set of operands is obtained from a first instruction of the sequence of instructions corresponding to the first mathematical expression, and an intermediate result of the corresponding set of intermediate results comprises an intermediate result name and an intermediate result value;

extracting a new intermediate result name corresponding to the first mathematical expression from a corresponding first instruction of the sequence of instructions; and adding the new intermediate result name and the new intermediate result value to the corresponding set of intermediate results.

16. The system of claim 10, further configured for:

extracting a final mathematical expression of a final instruction of the sequence of instructions, wherein the final mathematical expression references the corresponding set of intermediate results; and evaluating, by the numerical solver, the final mathematical expression to obtain the final result.

17. The system of claim 10, further configured for:

validating, by the precision check engine, the corresponding set of intermediate results and the final result; and adding, by the precision check engine, the sequence of instructions, the sequence of mathematical expressions, and the corresponding set of intermediate results to a computation log.

18. A method, comprising:

receiving a user prompt from a user application, the user prompt comprising a set of operands, and an instruction in natural language requesting a computation, wherein an operand comprises an operand name and an operand value, and the computation references the set of operands;

transmitting, by a structured reasoning framework to a large language model (LLM), a machine-readable prompt from a prompt template, the machine-readable prompt comprising the user prompt, and a second instruction directing an LLM to generate a sequence of instructions for generating a final result of the computation according to a structured reasoning process, wherein successive instructions of the sequence of instructions comprise corresponding mathematical expressions corresponding to successive steps of the computation, a mathematical expression comprising a partial computation of the set of operands and producing an intermediate result, and wherein the LLM is a foundation AI model having a transformer architecture fine-tuned on a document corpus;

processing, by the LLM, the machine-readable prompt, to generate the sequence of instructions, each instruction further comprising an explanation providing a natural language rationale for a corresponding mathematical expression, and wherein the sequence of instructions describing generating the final result of the computation;

converting, by a computation artificial intelligence (AI) agent separate from the LLM, the sequence of instructions to a corresponding sequence of mathematical expressions;

evaluating, by a numerical solver, a first mathematical expression of the corresponding sequence of mathematical expressions, wherein the first mathematical expression references a first set of operands, to obtain a first intermediate result value, wherein the first set of operands is obtained from a first instruction of the sequence of instructions, the first instruction corresponding to the first mathematical expression;

adding a first intermediate result name obtained from the first instruction and the first intermediate result value to a set of intermediate results, wherein the set of intermediate results corresponds to the sequence of mathematical expressions;

evaluating, by the numerical solver, a final mathematical expression of the corresponding sequence of mathematical expressions, wherein the final mathematical expression references the set of intermediate results, to obtain the final result;

performing, by a precision check engine, operations comprising:

performing a semantic similarity analysis to compare respective explanations of the sequence of instructions with a plurality of domain-specific reference explanations, using an embedding-based similarity function, and comparing the set of intermediate results and the final result with expected values, wherein the LLM resides on a first node of a network, and the precision check engine resides on a second node of the network; and presenting the final result.

* * * * *